(12) United States Patent
Rouse, Jr. et al.

(10) Patent No.: US 6,249,311 B1
(45) Date of Patent: Jun. 19, 2001

(54) LENS ASSEMBLY WITH INCORPORATED MEMORY MODULE

(75) Inventors: George B. Rouse, Jr., Foxboro; Richard L. Kimball, Pepperell, both of MA (US)

(73) Assignee: Inframetrics Inc., North Billerica, MA (US)

( * ) Notice: Subject to any disclaimer, the term of this patent is extended or adjusted under 35 U.S.C. 154(b) by 0 days.

(21) Appl. No.: 09/028,723

(22) Filed: Feb. 24, 1998

(51) Int. Cl.[7] .............................. H04N 5/33; H04N 9/73; H04N 5/76; G03B 3/00
(52) U.S. Cl. .................... 348/164; 348/224; 348/231; 348/233; 396/91
(58) Field of Search ..................................... 348/164, 224, 348/335, 342, 348, 360, 72, 207, 222, 231, 233; 396/91, 529–530

(56) References Cited

U.S. PATENT DOCUMENTS

| | | | |
|---|---|---|---|
| 5,036,399 | * 7/1991 | Mabuchi | 358/225 |
| 5,157,431 | * 10/1992 | Mabuchi et al. | 354/286 |
| 5,598,243 | * 1/1997 | Takagi | 396/51 |
| 5,627,583 | * 5/1997 | Nakamura et al. | 348/72 |
| 5,630,180 | * 5/1997 | Kusaka | 396/63 |
| 5,781,809 | * 7/1998 | Suzuki et al. | 396/134 |
| 5,896,166 | * 4/1999 | D'Alfonso et al. | 348/72 |

\* cited by examiner

*Primary Examiner*—Vu Le

(74) *Attorney, Agent, or Firm*—Edward L. Kelley; John A. Mereski

(57) ABSTRACT

An infrared video camera system having a plurality of interchangeable imaging lens units and optical filter units. Identifying information, used to modify the operation of the camera system based on the specific imaging lens unit and optical filter unit attached thereto, is stored in an Electrically Programmable Read Only Memory (EPROM) located in each imaging lens unit and optical filter unit.

28 Claims, 1 Drawing Sheet

LENS ASSEMBLY WITH INCORPORATED MEMORY MODULE

FIELD OF THE INVENTION

The present invention relates in general to an infrared video camera system having a plurality of interchangeable imaging lens units and optical filter units. In particular, the present invention provides a method and apparatus for storing identifying information in each of the imaging lens units and optical filter units that is used to modify the operation of the infrared video camera system.

BACKGROUND OF THE INVENTION

Recent infrared (IR) video camera systems employing IR sensitive elements, e.g., a Charged Coupled Device (CCD) focal plane array, are generally provided with a plurality of detachably mounted imaging lens units. This allows a user to interchangeably mount one lens unit at a time to the body of the video camera system, based on the object scene to be captured. Each imaging lens unit is configured to image at least a portion of the object scene onto the focal plane array, depending upon the field of view of the imaging lens unit. For example, a telephoto-type imaging lens unit will generally provide a relatively narrow viewing field, while other types of imaging lens units will provide a wide angle or mid-range field of view.

Such infrared video camera systems may also include a plurality of interchangeable optical filter units which are configured to filter the energy of the object scene prior to capture by the IR sensitive element. Such optical filter units may include spectrally narrowing bandpass filters, e.g., for preventing non-IR wavelengths from reaching the IR sensitive element, or for simply narrowing the spectral range of viewing, neutral density filters for attenuating the luminous energy reaching the IR sensitive element, and the like.

In infrared video camera systems of this type, both the individual imaging lens units and the individual optical filter units are identified to a microprocessor contained within the body of the camera, and a characteristic data set, stored in a memory device in the camera body, is made available to characterize or tailor the response of the IR sensitive sensor element to an object scene image. A set of characteristic data is stored in the camera memory for each type of imaging lens unit and optical filter unit which may be installed on the infrared video camera system. A typical characteristic data set may include a bias voltage for the IR sensitive element, a sensor integration time, an equalization table of pixel by pixel gain and/or offset data, and absolute temperature calibration data. In each case, the characteristic data set stored in the camera memory is predetermined to modify the camera system for operation with a corresponding imaging lens unit or optical filter unit.

Imaging lens and filter unit identifiers have heretofore utilized Hall-effect sensors mounted to the camera body, and one or more permanent magnets mounted onto the imaging lens unit housing and optical filter unit housing, to identify the imaging lens unit and optical filter unit to the microprocessor of the camera system. When the imaging lens unit and optical filter unit are attached to the camera body, the permanent magnets on the imaging lens unit and optical filter unit are aligned with the Hall-effect sensors attached to the camera body. The microprocessor software determines the status of the Hall-effect sensors, identifies the lens and filter configuration of the imaging lens and optical filter units based on the status of the sensors, and selects the appropriate characteristic data set from the camera memory.

A major problem with this approach is that one Hall-effect sensor is required for each binary bit of information. For example, a combination of 16 separate identifiers requires 4 sensors, since $2^4=16$. Further, since the Hall-effect sensors require a relatively large amount of space, and one or more wires must be attached to each Hall-effect sensor, the number of sensors which can be used is limited by the space and wiring constraints of the camera system. Clearly, including more substantial identifying information, such as lens transmission data, serial number or date placed in service, is not practical because of the large number of sensors that would be required.

A further disadvantage associated with the use of Hall-effect sensors is their susceptibility to magnetic fields. Occasionally, when used in or near strong magnetic fields, the output of the Hall-effect sensors may be adversely affected, potentially resulting in the misidentification of an attached imaging lens unit or optical filter unit, and the use of an incorrect characteristic data set for the operation of the camera system.

SUMMARY OF THE INVENTION

The present invention obviates the disadvantages associated with the use of Hall-effect sensors in an infrared video camera system by storing identifying information in an electronic memory, e.g. an Electrically Programmable Read Only Memory (EPROM), housed in each imaging lens unit and each optical filter unit.

Each imaging lens unit and optical filter unit includes a single, dedicated, small EPROM having sufficient capacity to store all necessary identifying information. Preferably, the EPROM is of the single data wire type, wherein the stored data is read out serially through a single wire.

The use of this type of EPROM overcomes the above-described limitations associated with Hall-effect sensors. For example, the EPROM is very small, and only one wire per imaging lens unit or optical filter unit is required to access the stored data, thereby removing the severe space and wiring constraints associated with the use of Hall-effect sensors. In addition, the magnitude of the identifier is essentially unlimited. Advantageously, more substantial and/or detailed identifying information, such as lens transmission data, serial number, or date placed in service, may now be stored and accessed by the microprocessor of the camera system. Also, unlike Hall-effect sensors, the EPROM is not susceptible to magnetic fields.

Generally, the present invention provides an infrared camera system for capturing an infrared image of a scene, comprising:

a camera body for housing an image capturing system, the image capturing system including an infrared sensor for providing an image signal, and an image processor for modifying the image signal;

a plurality of image forming devices interchangeably attachable to the camera body for forming an image of the scene onto the infrared sensor, each image forming device including a memory for storing at least one identifying characteristic;

a plurality of filter devices interchangeably attachable to the camera body for filtering the image of the scene formed onto the focal plane array, each filter device including a memory for storing at least one identifying characteristic;

an interface for communicating the stored identifying characteristics of the image forming device and the filter device attached to the camera body to the image processor; and a camera memory for storing a plurality of characteristic data sets;

wherein the image processor selects one of the plurality of characteristic data sets from the camera memory, and modifies the image signal using the selected characteristic data set, according to the identifying characteristics of the image forming device and the filter device attached to the camera body.

BRIEF DESCRIPTION OF THE DRAWINGS

The features of the present invention will best be understood from a detailed description of the invention and a preferred embodiment thereof selected for the purposes of illustration and shown in the accompanying drawing in which.

DETAILED DESCRIPTION OF THE INVENTION

Figure 1:
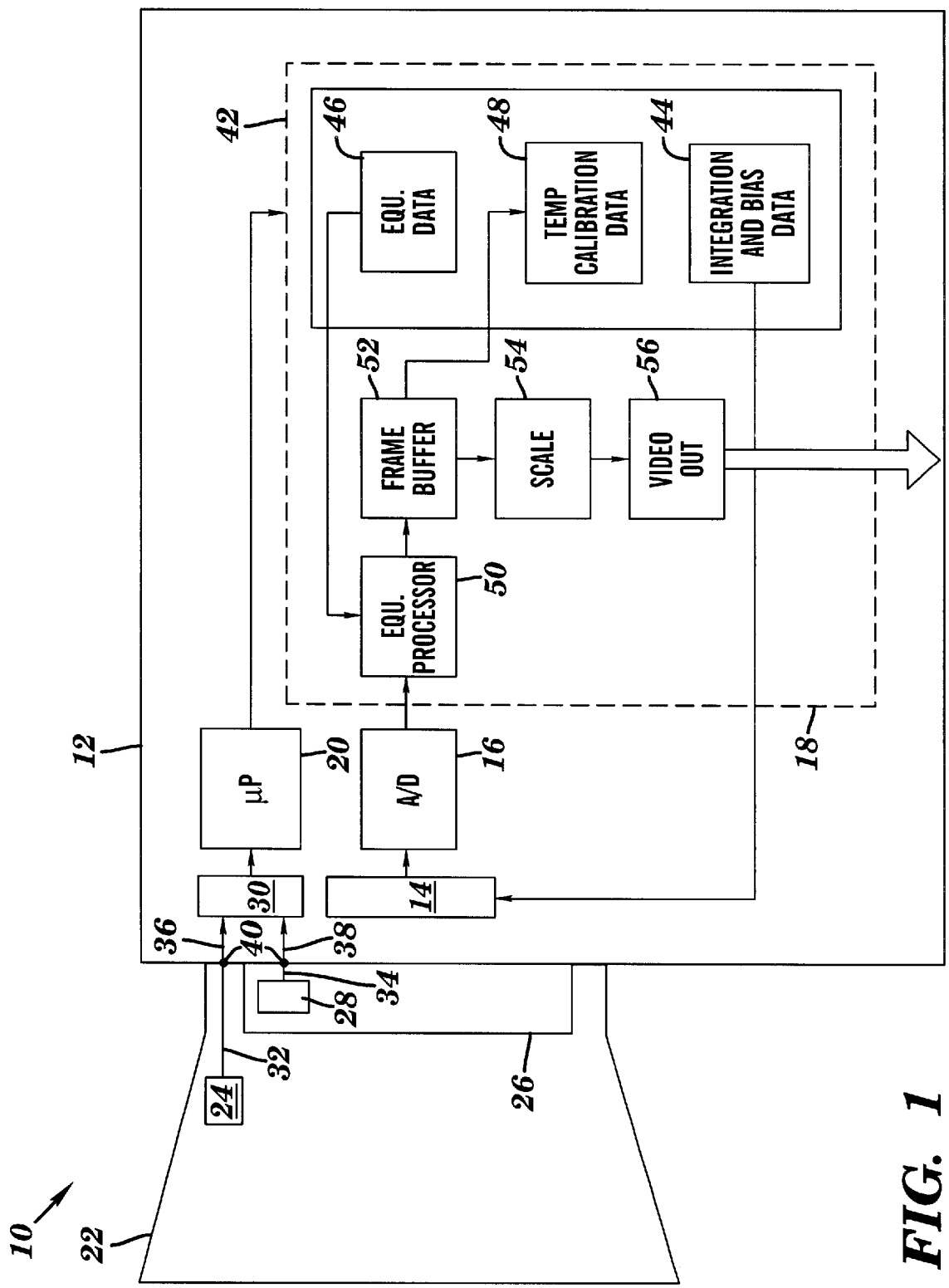
FIG. 1 illustrates an infrared video camera system in accordance with a preferred embodiment of the present invention.

Referring now specifically to FIG. 1, there is illustrated an infrared video camera system, generally designated as 10, in accordance with a preferred embodiment of the present invention. The infrared video camera system 10 includes a camera body 12 for housing an infrared sensor arrangement 14, such as a CCD focal plane array, an analog to digital (A/D) converter 16 for converting the analog video output of the infrared sensor arrangement 14 into digital image signals, and an image processor, referred to generally by reference numeral 100. The image processor 100 includes a digital image processor 18 for modifying the digital image signals and for preparing the digital image signals for video display, and a microprocessor 20 which directs the operation of the digital image processor 18, as well as other operations of the video camera system.

An imaging lens unit 22, for imaging at least a portion of an object scene onto the infrared sensor arrangement 14, is detachably mounted onto the camera body 12. Preferably, a plurality of different imaging lens units 22 may be interchangeably mounted onto the camera body 12, depending upon the object scene to be captured, environmental conditions, and other factors.

Each imaging lens unit 22 is provided with a memory module 24 for storing identifying information corresponding to that imaging lens unit 22. The identifying information for each imaging lens unit 22 may include, for example, the type of imaging lens unit (e.g., telephoto, wide-angle), spectral characteristics of the imaging lens unit optical system, lens transmission data, manufacturer, lens serial number, date placed in service and or date of repair or calibration, and the like. Of course, other types of identifying information may be stored in the memory module 24 without departing from the intended scope of the present invention.

The memory module 24 preferably comprises an EPROM or other type nonvolatile memory having sufficient capacity to store all required identifying information. In accordance with the preferred embodiment of the present invention, the memory module 24 is a single data wire type, such as the DS2502P 1 Kbit EPROM manufactured by Dallas Semiconductor. In this type of EPROM, control, address, data, power, and programming signals are communicated through a single wire connection. The EPROM also includes a ground connection which may be terminated within the lens or filter unit. The use of this type of memory module 24 reduces the wiring and interfacing requirements for accessing the identifying information stored in each imaging lens unit 22.

An optical filter unit 26 may also be detachably mounted onto the camera body 12. As illustrated in FIG. 1, the optical filter unit 26 is positioned between the imaging lens unit 22 and the camera body 12. Alternately, the filter may be positioned between the imaging unit 22 and the object scene, or may be detachably mounted to the imaging lens unit 22. The optical filter unit 26 selectively filters the energy of the object scene captured by the imaging lens unit 22 prior to imaging on the infrared sensor arrangement 14. As with the imaging lens unit 22, a plurality of different optical filter units 26 may be interchangeably mounted onto the camera body 12 or onto the imaging lens unit 22.

Each optical filter unit 26 is provided with a memory module 28 for storing identifying information corresponding to that optical filter unit 26. The identifying information stored in the memory module 28 may include, for example, filter type, spectral and or transmissive filtering characteristics, manufacturer, and other filter related information. The memory module 28 of the optical filter unit 26 preferably comprises the single data wire EPROM described above with reference to the memory module 24 of the imaging lens unit 22.

Identifying information stored on the memory modules 24, 28 is accessed by the microprocessor 20 through an interface 30 when an imaging lens unit 22 and an optical filter unit 26 are attached to the camera body 12 as shown in FIG. 1. Upon attachment of an imaging lens unit 22 and an optical filter unit 26 to the camera body 12, the single data wires 32, 34 of the memory modules 24, 28 are connected to corresponding input leads 36, 38 of the interface 30 through suitable point to point contacts 40. If the imaging lens unit 22 is used without an accompanying optical filter unit 26, wire 32 is connected to lead 36 of the interface 30, while lead 38 remains unconnected. If the filter unit 26 is detachably mounted to the imaging lens unit 22, e.g. between the imaging lens and the object scene, a electrical path can be provided between the filter memory module 28 and the input lead 38 through the imaging lens unit 22 using suitable point to point contacts on either end of the imaging lens unit.

The microprocessor 20 analyzes the identifying information received from the memory modules 24, 28, and instructs the digital image processor 18 to use a characteristic data set, stored in a memory module 42 in the camera body 12, to modify the response and/or output of the infrared sensor arrangement 14. A characteristic data set is stored in the memory module 42 for each type of imaging lens unit 22 and optical filter unit 26, or combination thereof, which may be installed on the infrared video camera system 10.

Preferably, the memory module 42 is a flash-type memory, thereby allowing the characteristic data sets stored therein to be easily deleted, updated, added, or otherwise modified as necessary. For example, a characteristic data set may need to be added to memory module 42 if a new type of imaging lens unit 22 or optical filter unit 26 becomes available for use with the infrared video camera system 10.

Each characteristic data set stored in the memory module 42 may include, for example, data 44 regarding the required integration time and or bias voltage of the infrared sensor arrangement 14, equalization data 46 for applying a pixel to pixel correction to the digital image data output by the A/D converter 16, or data 48 which is used as a look up table by the microprocessor 20 to convert the pixel data of the frame buffer 52 to absolute temperature values, e.g. in degrees centigrade or Fahrenheit. Of course, other types of data for modifying the response/output of the infrared sensor arrangement 14 may be included in one or more of the characteristic data sets stored in the memory module 42 without departing from the intended scope of the present invention.

In operation, the image processor 100 uses the data 44, 46, 48 stored in the memory module 42 in various ways. The integration time and bias voltage data 44 is provided directly to the infrared sensor arrangement 14 to modify its infrared response in accordance with the particular imaging lens 22 or filter unit 26 mounted to the camera body 12 or camera system 10. Since the infrared sensor provides an analog image signal, data 44 modifies the analog image signal. The analog image signal is converted to digital image data by the A/D converter 16. The equalization data 46 is used by an equalization processor 50 to apply a pixel to pixel correction to the raw digital image data output by the A/D converter 16. Such a correction may adjust individual pixel gains and or offsets to compensate for factors such as pixel to pixel variations. Again, the equalization data 46 is selected according to the particular imaging lens 22 or filter unit 26 mounted to the camera body 12 or camera system 10. This corrected digital image data is subsequently stored in a frame buffer 52. Thereafter, the digital image data stored in the frame buffer 52 may be used in conjunction with temperature calibration data 48 to provide absolute temperature values for individual pixels of the object scene image. Finally, the modified digital data is scaled by a scaling device 54 which may select the entire scene image or a portion of the scene image for display on a video display device and adjust resolution, brightness, contrast, or other video parameters, for displaying the infrared scene image on a monitor or other video display device. A video output driver 56 provides the infrared video scene image data in a format for video display.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, e.g. an infrared sensor assembly and an infrared video camera system, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

I/We claim:

1. An infrared camera system for capturing an infrared image of a scene, comprising:
    a camera body for housing an image capturing system, the image capturing system including an infrared sensor for providing an image signal, and an image processor for modifying the image signal;
    a plurality of image forming devices interchangeably attachable to the camera body for forming an image of the infrared scene onto the infrared sensor, each image forming device including a first memory module for storing at least one identifying characteristic of the image forming device;
    an interface for communicating the at least one identifying characteristic of the image forming device attached to the camera body from the first memory module to the image processor; and
    a second memory module in communication with the image processor and housed within the camera body for storing a plurality of characteristic data sets, each characteristic data set corresponding to an imaging characteristic of one of the plurality of image forming devices; and,
    wherein the image processor selects one of the plurality of characteristic data sets from the second memory module, in accordance with the identifying characteristic received from the first memory module, and modifies the image signal according the selected characteristic data set.

2. The infrared camera system according to claim 1, wherein the infrared sensor comprises a focal plane array.

3. The infrared camera system according to claim 1, wherein the first memory module is a read only memory.

4. The infrared camera system according to claim 1, further including:
    a plurality of filter devices interchangeably attachable to the infrared camera system for filtering the image of the scene formed onto the infrared sensor, each filter device having a filtering characteristic, said plurality of filter devices each including a third memory module for storing at least one filter identifying characteristic;
    an interface for communicating the at least one filter identifying characteristic of the filter device attached to the infrared camera system from the third memory module to the image processor; and
    wherein the second memory module further stores a second plurality of characteristic data sets, each second characteristic data set corresponding to a filtering characteristic of one of the plurality of filter devices such that based on the identifying characteristic received from the third memory module, the image processor selects one of the plurality of second characteristic data sets from the second memory module, and modifies the image signal based thereon.

5. The infrared camera system according to claim 4, wherein said third memory module is a read only memory.

6. The infrared camera system according to claim 4, wherein at least one of the plurality of second characteristic data sets includes values for modifying at least one of a bias voltage of the infrared sensor and an integration time of the infrared sensor.

7. The infrared camera system according to claim 1, wherein the second characteristic data set selected from the second memory module includes data for modifying at least one of a bias voltage of the infrared sensor and an integration time of the infrared sensor.

8. The infrared camera system according to claim 1, further including an analog to digital (A/D) converter for converting an analog output of the infrared sensor into digital data, and wherein the characteristic data set selected from the camera memory includes data for applying a pixel to pixel correction to the digital data.

9. The infrared camera system according to claim 1, further including an analog to digital (A/D) converter for converting an analog output of the infrared sensor into digital data, and wherein the image processor selects at least one of the plurality of characteristic data sets from the camera memory to determine an absolute temperature of at least one pixel of the infrared image scene.

10. The infrared camera system according to claim 1, wherein a single data wire is used for communicating between the first memory module and the image processor, said single data wire serving to communicate control, address and programming signals, as well as data and power between the third memory module and the image processor.

11. A method for modifying an image signal produced by an infrared camera system, wherein a plurality of image forming devices may be interchangeably attached to the camera system, and wherein a plurality of filter units may be interchangeably attached to the camera system, comprising the steps of:

storing at least one filter identifying characteristic in each filter device;

storing at least one identifying characteristic in each imaging forming device;

attaching one of the plurality of filter devices to the camera system;

attaching one of the plurality of image forming devices to the camera system;

transmitting the at least one filter identifying characteristic from the attached filter device to the camera system;

transmitting the at least one identifying characteristic from the attached image forming device to the camera system;

retrieving at least one characteristic data set stored within the camera system based on the identifying characteristics received by the camera system from the attached filter and the attached image forming device;

capturing an image of a scene using the camera system, and producing the image signal corresponding thereto; and modifying the image signal using the at least one retrieved characteristic data set.

12. The method for modifying an image signal according to claim 11, wherein the camera system captures the image signal using an infrared sensor, and wherein the step of modifying the image signal comprises at least one of: modifying a bias voltage of the infrared sensor and modifying an integration time of the infrared sensor.

13. The method for modifying an image signal according to claim 11, further including the step of:

storing a plurality of the characteristic data sets, within the camera system such that a characteristic data set is stored for each possible combination of the image forming devices and filter devices that are attachable to the camera system.

14. The method for modifying an image signal according to claim 11, wherein the image signal is an analog image signal, further including the steps of:

converting the analog image signal to a digital image signal; and, modifying the digital image signal using one of the retrieved characteristic data sets.

15. The method for modifying an image signal according to claim 14, wherein the digital image signal is modified to provide a pixel to pixel correction.

16. A method of generating a video image of a scene with a video camera system said video camera system comprising a sensor housed within a camera body for providing an analog electrical signal in response to being illuminated by the scene, an image processor housed within the camera body and in communication with the sensor for converting the analog electrical signal to a video image of the scene, said method comprising the steps of:

providing a plurality of image forming devices for interchangeably attaching to the camera body for forming an image of the scene onto the sensor, each of said plurality of image forming devices having a performance characteristic associated therewith;

providing a first memory module attached to each of the plurality of image forming devices, said first memory module storing an identifying characteristic associated with the performance characteristic of the image forming device;

providing a second memory device housed within the camera body and in communication with the image processor for storing a plurality of characteristic data sets, each data set corresponding to one of said performance characteristics;

communicating the identifying characteristic of the image forming device mounted to the camera body to the image processor;

analyzing the identifying characteristic received from the first memory module;

selecting a characteristic data set stored in the second memory module based on the results of the analysis; and, modifying the video image in accordance with the selected characteristic data set.

17. The method of claim 16 wherein the step of modifying the video image includes modifying at least one of a bias voltage of the sensor and an integration time of the infrared sensor.

18. The method of claim 16 wherein the step of modifying the video image further includes the step of converting the analog electrical signal representative of the image of the scene to a digital image signal representative of the image scene and then modifying the digital image signal with the selected characteristic data set.

19. The method of claim 18 further comprising the step of adjusting individual pixel gains in order to compensate for pixel to pixel variations.

20. The method according to claim 16 wherein said sensor is an infrared sensor and wherein each of said plurality of image forming devices is configured for forming an infrared image onto the infrared sensor.

21. The method of claim 20 further comprising the step of determining an absolute temperature of at least a portion of said infrared image.

22. An imaging system for capturing an image of a scene, comprising:

a sensor housed within a camera body for providing an analog electrical signal representative of the image of the scene;

an image processor housed within the camera body and in communication with the sensor for converting the analog electrical signal into a video image of the scene;

an image forming device detachably connected to the camera body for forming an image of the scene onto the sensor, said image forming device having a performance characteristic and at least one identifying characteristic;

a first memory module mounted to the imaging forming device for storing the at least one identifying characteristic of the image forming device;

a communication interface established between the first memory module and the image processor, when the image forming device is detachably connected to the camera body, for communicating the at least one identifying characteristic from the first memory module to the image processor, thereby identifying the image forming device connected to the camera body to the image processor so that the image processor can modify the video image of the scene in accordance with the performance characteristic of the image forming device; and, further comprising a second memory module housed within the camera body and in communication with the image processor for storing a characteristic data set for modifying the video image, the characteristic data set being predetermined according to the performance characteristic.

23. An imaging system for capturing an image of a scene, comprising:

a camera body for housing an image capturing system, the image capturing system including a sensor for providing an image signal in response to being illuminated by the scene, and an image processor for modifying the image signal;

a plurality of image forming devices interchangeably attachable to the camera body for forming an image of the scene onto the sensor, each image forming device including a first memory module for storing at least one identifying characteristic of the image forming device;

an interface for communicating the at least one identifying characteristic of the image forming device attached to the camera body from the first memory module to the image processor;

a second memory module in communication with the image processor and housed within the camera body for storing a plurality of characteristic data sets, each characteristic data set corresponding to an imaging characteristic of one of the plurality of image forming devices; and, wherein the image processor selects one of the plurality of characteristic data sets from the second memory module in accordance with the identifying characteristic received from the first memory module, and modifies the image signal according to the selected characteristic data set.

24. The imaging system according to claim 23, wherein the sensor comprises a focal plane array.

25. The imaging system according to claim 23, wherein said first memory module is a read only memory.

26. The imaging system according to claim 23 further including:

a plurality of filtering devices interchangeably attachable to the camera system for filtering the image of the scene formed onto the sensor by the image forming device, each filtering device having a filtering characteristic, said plurality of filtering devices each including a third memory module attached thereto for storing a filter identifying characteristic an interface for communicating the filter identifying characteristic of the filtering device attached to the imagine system from the third memory module to the image processor; and, wherein the second memory module further stores a second plurality of characteristic data sets, each second characteristic data set corresponding to a filtering characteristic of one of the plurality of filter devices such that based on the identifying characteristic received from the third memory module, the image processor selects one of the plurality of second characteristic data sets from the second memory module, and modifies the image signal according to the selected characteristic data set.

27. The imaging system according to claim 26, wherein said third memory module of the filter device is a read only memory.

28. The imaging system according to claim 26, wherein a single data wire is used for communicating between the third memory module and the image processor, said single data wire serving to communicate control, address and programming signals, as well as data and power between the third memory module and the image processor.

\* \* \* \* \*